US 11,977,283 B2

(12) United States Patent
Wooten

(10) Patent No.: US 11,977,283 B2
(45) Date of Patent: May 7, 2024

(54) HYBRID ELECTRO-OPTIC POLYMER / THIN FILM LITHIUM NIOBATE INTEGRATED OPTICAL MODULATOR

(71) Applicant: Photonic Systems, Inc., Billerica, MA (US)

(72) Inventor: Edward Wooten, San Jose, CA (US)

(73) Assignee: Photonic Systems, Inc., Billerica, MA (US)

( * ) Notice: Subject to any disclaimer, the term of this patent is extended or adjusted under 35 U.S.C. 154(b) by 207 days.

(21) Appl. No.: 17/827,913

(22) Filed: May 30, 2022

(65) Prior Publication Data

US 2022/0382083 A1 Dec. 1, 2022

Related U.S. Application Data

(60) Provisional application No. 63/195,154, filed on May 31, 2021.

(51) Int. Cl.
  *G02F 1/035* (2006.01)
  *G02F 1/03* (2006.01)
(52) U.S. Cl.
  CPC ............ *G02F 1/035* (2013.01); *G02F 1/0327* (2013.01); *G02F 2202/20* (2013.01)
(58) Field of Classification Search
  None
  See application file for complete search history.

(56) References Cited

U.S. PATENT DOCUMENTS

| | | | |
|---|---|---|---|
| 9,977,270 B2 * | 5/2018 | Ishikawa | G02F 1/313 |
| 2022/0291567 A1 * | 9/2022 | Sugiyama | G02F 1/212 |
| 2022/0382083 A1 * | 12/2022 | Wooten | G02F 1/035 |

OTHER PUBLICATIONS

Block, B.A., et al., "Electro-Optic Polymer Cladding Ring Resonator Modulators", Optics Express, 2008, vol. 16, No. 22, 18326, pp. 1-8.
Qiu, F., et al., "Thin TiO2 Core and Electro-Optic Polymer Cladding Waveguide Modulators", Applied Physics Letters, 2013, vol. 102, No. 23, 233504, pp. 1-4.
Qiu, F., et al., "Ultra-Thin Silicon/Electro-Optic Polymer Hybrid Waveguide Modulators", Applied Physics Letters, 2015, vol. 107, No. 12, 123302, pp. 1-6.
Wang, C., et al., "Integrated Lithium Niobate Electro-Optic Modulators Operating at CMOS-Compatible Voltages", Nature, 2018, vol. 562, pp. 1-12.

* cited by examiner

*Primary Examiner* — Rhonda S Peace
(74) *Attorney, Agent, or Firm* — Rauschenbach Patent Law Group, PLLC; Kurt Rauschenbach

(57) ABSTRACT

A method and apparatus for efficiently modulating light includes forming a lithium niobate waveguide with a slab region and a ridge region to confine an optical mode traversing the optical modulator under the ridge region. An electro-optic polymer is formed on a top surface of the lithium niobate waveguide with the slab region and the ridge region having dimension sufficient to support an evanescent tail of the optical mode traversing the optical modulator under the ridge region during modulation. Light is applied to an input of the lithium niobate waveguide. A drive voltage is applied to the electro-optic polymer that modulates the light with the evanescent tail so that the mode expands into the electro-optic polymer material a length that provides a desired switching voltage-length product ($V_\pi * L$).

25 Claims, 5 Drawing Sheets

HYBRID ELECTRO-OPTIC POLYMER / THIN FILM LITHIUM NIOBATE INTEGRATED OPTICAL MODULATOR

CROSS REFERENCE TO RELATED APPLICATIONS

The present application is a non-provisional application of U.S. Provisional Patent Application No. 63/195,154, entitled "Hybrid Electro-Optic Polymer/Thin Film Lithium Niobate Integrated Optical Modulator" filed on May 31, 2021. The entire contents of U.S. Provisional Patent Application No. 63/195,154 are herein incorporated by reference.

The section headings used herein are for organizational purposes only and should not be construed as limiting the subject matter described in the present application in any way.

INTRODUCTION

Thin film lithium niobate (TFLN) photonic circuits have demonstrated significant advantages in applications, such as high frequency optical modulation. See, for example, Integrated "Lithium Niobate Electro-Optic Modulators Operating at CMOS-Compatible Voltages", Cheng Wang, et al, Nature, 4 Oct. 2018, vol. 562, which is incorporated herein by reference.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

Figures 1A, 1B:
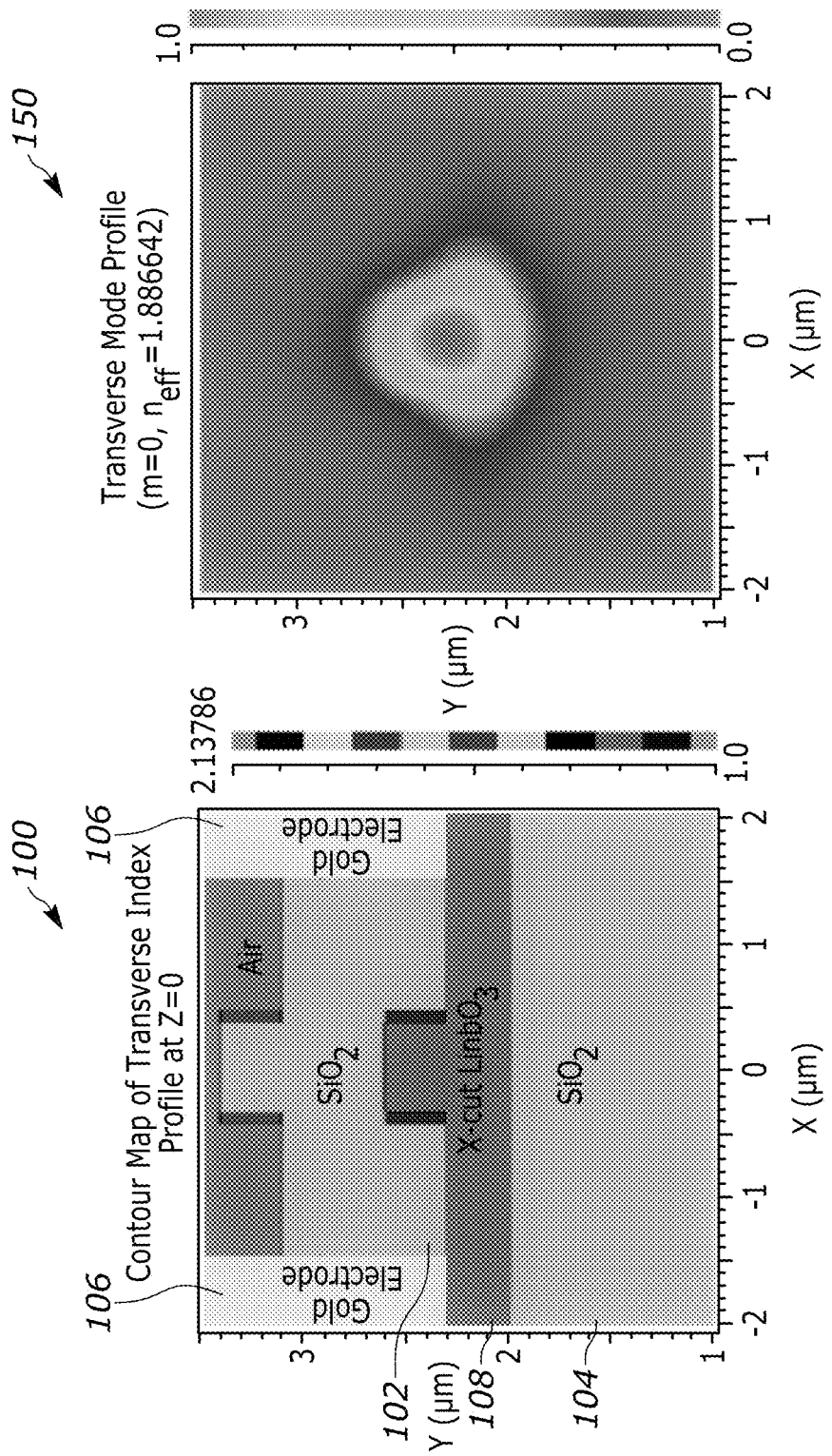
FIG. 1A illustrates a cross section of a typical X-cut thin film lithium niobate optical ridge waveguide phase modulator.
FIG. 1B illustrates a mode profile of a typical thin film lithium niobate optical modulator.

Thin film lithium niobate photonic circuits use ridge waveguides in electro-optic lithium niobate (LN) material in order to confine the optical mode. FIG. 1A illustrates a cross section of a typical X-cut thin film lithium niobate optical ridge waveguide phase modulator 100. Both the superstrate 102 and substrate 104 (buried oxide) are formed of silicon dioxide. Gold electrodes 106 are deposited directly on the lithium niobate 108.

In operation, the voltage applied to the electrodes 106 on either side of the waveguide produces an electric field in the lithium niobate 108, which changes the refractive index of the material and thus the phase of the optical signal propagating through the waveguide. Note that the ridge structure functions to confine the optical mode mostly within the lithium niobate material. However, note that the silicon dioxide superstrate 102 and substrate 104 provide essentially no electro-optic effect for the modulator.

FIG. 1B illustrates a mode profile 150 of a typical thin film lithium niobate optical modulator. The mode profile 150 for the structure described in connection with FIG. 1A indicates that a significant portion of the optical mode extends outside of the lithium niobate electro-optic (EO) material.

One approach to reducing the switching voltage of known X-cut thin film lithium niobate optical ridge waveguide phase modulators is to use an electro-optic material to construct the cladding so that there is some level of modulation for the evanescent tail of the optical mode. This technique has been used for silicon ridge waveguides. See, for example, "Ultra-Thin Silicon/Electro-Optic Polymer Hybrid Waveguide Modulators", F. Qiu, et al, Applied Physics Letters, 107(12), (2015), 123302, which is incorporated herein by reference. This technique has also been used for silicon nitride ridge waveguides. See, for example, "Electro-Optic Polymer Cladding Ring Resonator Modulators", B. A. Block, et al, Optics Express, 16(22), (2008), 18326, which is incorporated herein by reference. In addition, this technique has also been used for titanium dioxide ridge waveguides. See, for example, "Thin $TiO_2$ Core and Electro-Optic Polymer Cladding Waveguide Modulators", F. Qiu, et al., Applied Physics Letters, 102(23), (2013) 233504. However, none of the core materials described in these references exhibit a primary electro-optic Pockels effect, which is a linear electro-optic effect where the birefringence is proportional to the applied electric field. Consequently, electro-optic modulation in the core material is sacrificed.

Figures 2A, 2B:
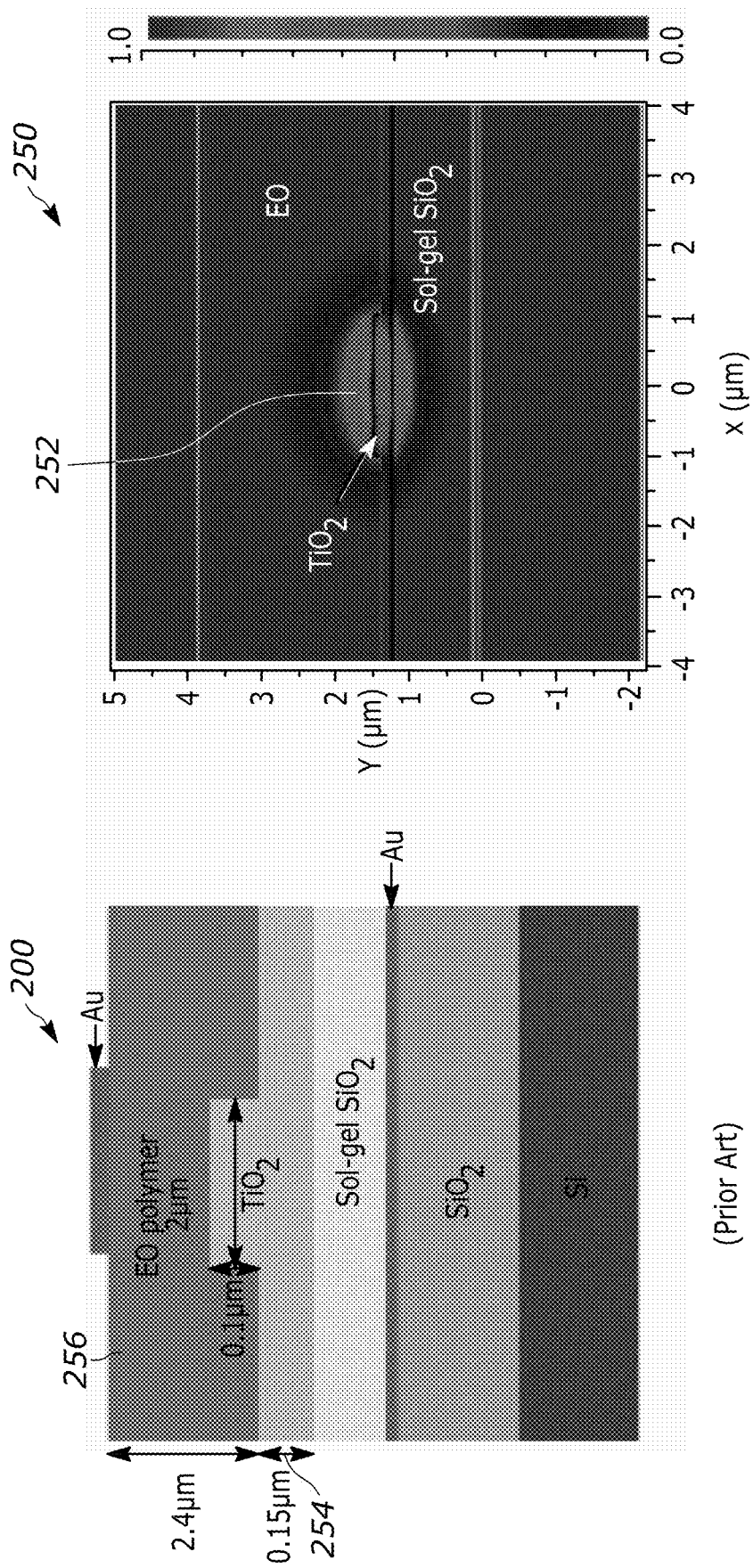
FIG. 2A illustrates the waveguide structure of a known titanium dioxide/electro-optic polymer clad waveguide.
FIG. 2B illustrates the peak optical mode profile for the titanium dioxide/electro-optic polymer clad waveguide structure illustrated in FIG. 2A.

FIG. 2A illustrates the waveguide structure of a known titanium dioxide/electro-optic polymer clad waveguide 200, such as the titanium dioxide/electro-optic polymer clad waveguide structure that was described in connection with the reference F. Qiu, et al., Applied Physics Letters, 102(23), (2013) 233504.

FIG. 2B illustrates the peak optical mode profile 250 for the titanium dioxide/electro-optic polymer clad waveguide structure illustrated in FIG. 2A. Referring to both FIGS. 2A and 2B, with the waveguide structure illustrated in FIG. 2A, the peak of the optical mode 252 resides in the titanium dioxide layer 254 and the electro-optic modulation is performed in the polymer cladding 256.

In known optical modulator configurations designed prior to the thin-film lithium niobate (TFLN) devices of the present teaching, the dielectric optical waveguides used in electro-optic modulators fabricated in lithium niobate were most often realized by in-diffusing titanium to create selected regions with greater refractive index surrounded by lower-index lithium niobate on three sides and air on the top side. In contrast, the thin-film lithium niobate devices according to the present teaching have the waveguides positioned on top of the substrate. Consequently, the optical fields are effectively confined to within these lithium niobate regions because they have higher index than the air that surrounds them on three out of four sides. Therefore, surrounding a thin-film lithium niobate waveguide on those three sides with a material that has a relatively high electro-optic coefficient rather than with air, increases the efficiency with which light in the optical waveguides is modulated by applied electrical signals. That is, a modulator in which a high-electro-optic-coefficient material, such as a polymer, replaces the air that surrounds three sides of the thin-film lithium niobate waveguides will have a lower $V\pi$ than a modulator in which air surrounds those three sides, thereby providing significant performance advantages.

Thus, as described further below an electro-optic polymer/thin film lithium niobate integrated optical modulator according to the present teaching uses a thin film lithium niobate ridge waveguide as the core waveguide material with an electro-optic polymer cladding. Such a structure allows for electro-optic modulation in both the core material and in the cladding, thus advantageously reducing the switching voltage of the modulator.

Figures 3A, 3B:
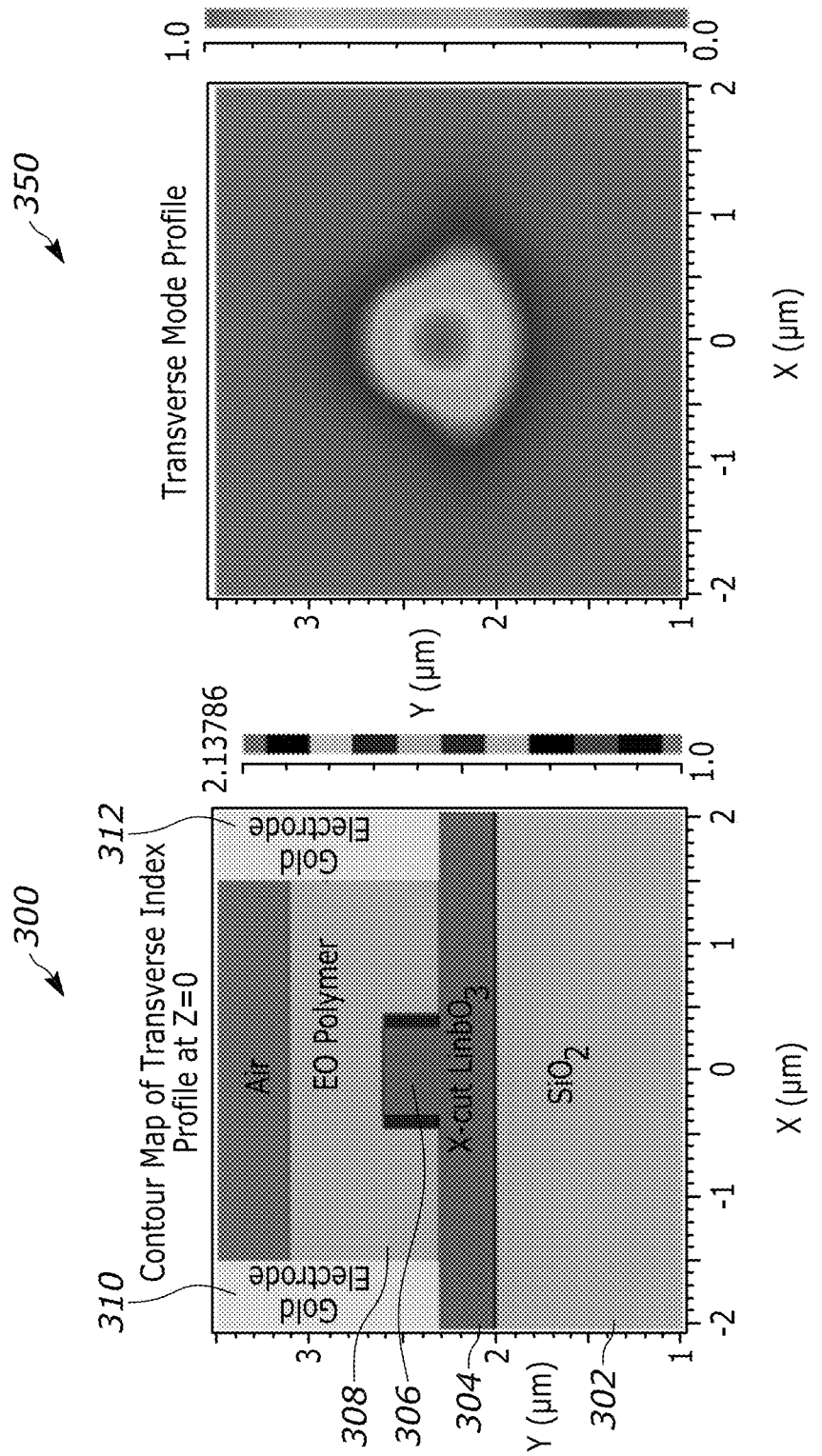
FIG. 3A illustrates a hybrid electro-optic polymer thin film X-cut lithium niobate optical ridge waveguide phase modulator with electro-optic polymer cladding according to the present teaching.
FIG. 3B illustrates the peak optical mode profile for the hybrid X-cut electro-optic polymer thin film lithium niobate optical ridge waveguide phase modulator with electro-optic polymer cladding shown in FIG. 3A.

FIG. 3A illustrates a hybrid electro-optic polymer thin film lithium niobate optical ridge waveguide phase modulator 300 with electro-optic polymer cladding according to the present teaching. The particular waveguide structure shown in FIG. 3A is an X-cut lithium niobate configuration. However, it should be understood that the hybrid electro-optic polymer thin film lithium niobate optical ridge waveguide phase modulator can be configured with either X-cut or Z-cut lithium niobate.

The hybrid electro-optic polymer thin film X-cut lithium niobate optical ridge waveguide phase modulator 300 includes a silicon dioxide substrate 302. X-cut lithium niobate 304 is formed on top of the silicon dioxide substrate 302 with a ridge waveguide structure 306. An electro-optic polymer 308 is formed on at least a portion of the X-cut lithium niobate 304. An electrode 310, such as a gold electrode, is positioned to contact both a portion of the lithium niobate waveguide and the electro-optic polymer on a first side. Another electrode 312, such as a gold electrode, is positioned to contact both a portion of the lithium niobate waveguide and the electro-optic polymer on a second side.

In the configuration shown in FIG. 3A, the superstrate 308 is an electro-optic polymer that provides electro-optic modulation in the core $LiNbO_3$ material 304 as well as in the electro-optic polymer cladding. The electro-optic coefficient of lithium niobate is 30 pm/V, whereas electro-optic polymers have been demonstrated with electro-optic coefficients as high as 2000 pm/V.

One aspect of the present teaching is that by using a configuration that narrows the width of the lithium niobate ridge in the waveguide, the optical mode can be significantly expanded further into the electro-optic polymer cladding layer. Thus, even though the electro-optic polymer is only modulating the evanescent tail of the mode, the electro-optic polymer can provide a significant contribution to the total modulation of the device.

FIG. 3B illustrates the peak optical mode profile 350 for the hybrid electro-optic polymer thin film X-cut lithium niobate optical ridge waveguide phase modulator with electro-optic polymer cladding shown in FIG. 3A.

Figures 4A, 4B:
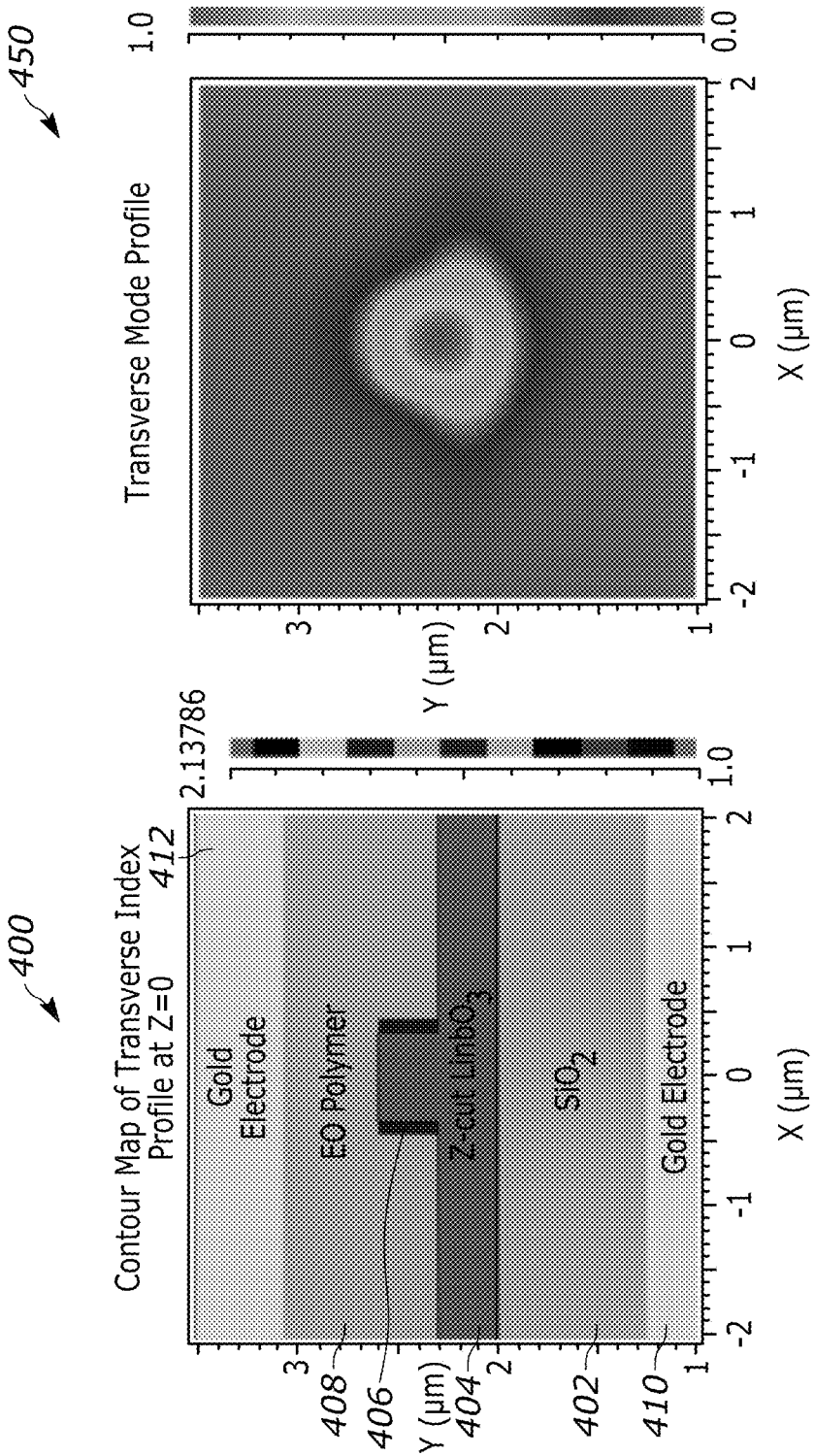
FIG. 4A illustrates a hybrid electro-optic polymer thin film Z-cut lithium niobate optical ridge waveguide phase modulator with electro-optic polymer cladding according to the present teaching.
FIG. 4B illustrates the peak optical mode profile for the hybrid Z-cut electro-optic polymer thin film lithium niobate optical ridge waveguide phase modulator with electro-optic polymer cladding shown in FIG. 4A.

FIG. 4A illustrates a hybrid electro-optic polymer thin film Z-cut lithium niobate optical ridge waveguide phase modulator with electro-optic polymer cladding 400 according to the present teaching. The hybrid electro-optic polymer thin film Z-cut lithium niobate optical ridge waveguide phase modulator 400 includes a silicon dioxide substrate 402. Z-cut lithium niobate 404 is formed on top of the silicon dioxide substrate 402 with a ridge waveguide structure 406. An electro-optic polymer 408 is formed on the Z-cut lithium niobate 404. An electrode 410 such as a gold electrode, is formed on the outer surface of substrate 402. Another electrode 412 is formed on the outer surface of electro-optic polymer 408.

FIG. 4B illustrates the corresponding peak optical mode profile 450 for the hybrid electro-optic polymer thin film Z-cut lithium niobate optical ridge waveguide phase modulator with electro-optic polymer cladding 400 shown in FIG. 4A.

Figure 5:
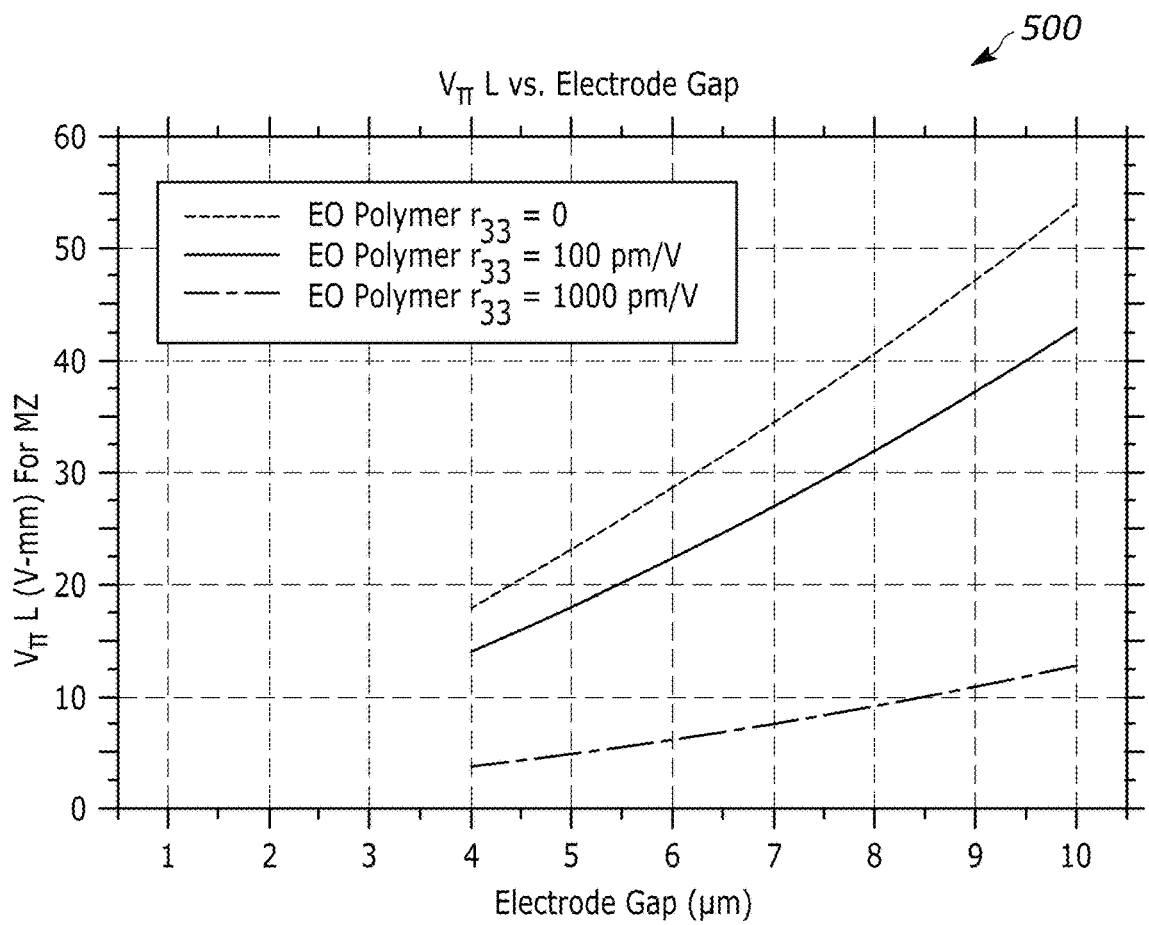
FIG. 5 illustrates a graph of the switching voltage*length ($V_\pi$*L) product for a hybrid electro-optic polymer thin film X-cut lithium niobate optical ridge waveguide phase modulator according to the present teaching using polymers with various different electro-optic coefficients.

FIG. 5 illustrates a graph 500 of the switching voltage*length ($V_\pi$*L) product for a hybrid electro-optic polymer thin film X-cut lithium niobate optical ridge waveguide phase modulator according to the present teaching using polymers with various different electro-optic coefficients. The graph plots the product of switching voltage $V\pi$ in Volts and the length L in millimeters as a function of the electrode gap in microns. Three different plots are shown for a polymer with $r_{33}$ of 0, 100 pm/V and 1000 pm/V. These data indicate the numerous commercial advantages of the structure according to the present teaching. For example, using a polymer with $r_{33}$=1000 pm/V can result in a fivefold reduction in the $V_\pi L$ product. In various embodiments according to the present teaching, the electro-optic polymer is selected so that a $V_\pi *L$ product is in a range from about 5 V-mm to 42 V-mm.

Figure 6:
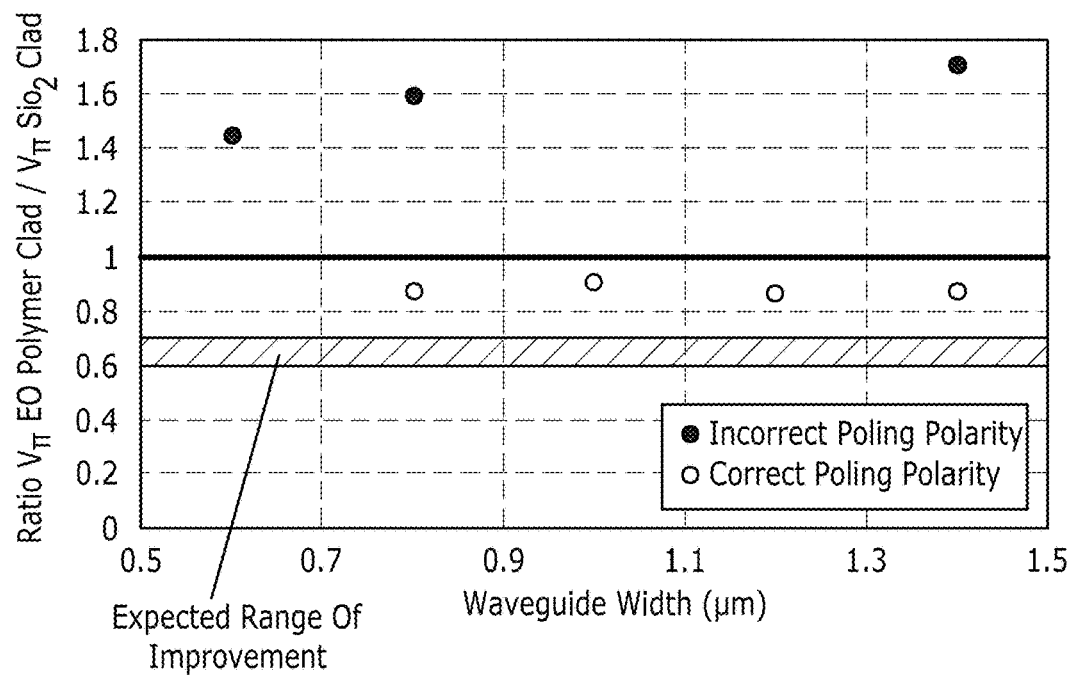
FIG. 6 illustrates a plot of a ratio of measured $V\pi$ for a phase modulator constructed in X-cut thin-film lithium niobate with EO polymer cladding waveguides to $V\pi$ for the same phase modulator with non-polymer-clad waveguides, as a function of waveguide width.

FIG. 6 illustrates a plot 600 of a ratio of measured $V\pi$ of a phase modulator fabricated in X-cut thin-film lithium niobate with EO polymer-clad waveguides to $V\pi$ for the same phase modulator with non-polymer-clad waveguides, as a function of waveguide width. The plot 600 summarizes the results of applying the electro-optic polymer cladding to optical waveguides of widths of 0.6-1.4 µm. However, it should be understood that there is a wide range of widths of the ridge region of the lithium niobate waveguide according to the present teaching. For example, in various embodiments, the widths of the ridge region can be in the range of 0.1-5 µm. A ratio of one indicates no improvement. A ratio of greater than one indicates a worsening of performance. However, a ratio of less than one represents an improvement in performance. At first, the poling was applied with the wrong polarity, causing measured $V\pi$ for polymer-cladded waveguides of 0.6 µm, 0.8 µm, and 1.4 µm width to be higher, which represents a worse performance than for non-polymer-cladded waveguides. With the poling polarity corrected, measured $V\pi$ for polymer-cladded waveguides of 0.8 µm, 1.0 µm, 1.2 µm, and 1.4 µm width improved by ~13% compared with non-polymer-cladded waveguides. These data were encouraging, but smaller than the 30-40% improvement that was anticipated. It is believed that arcing across some of the electrode gaps during poling resulted in incomplete poling of the polymer. However, it is further believed that the fabrication and poling processes only needs some improvement and/or optimization of at least some parameters to ensure that this arcing is avoided.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. An optical modulator comprising:
a) a silicon dioxide substrate;
b) an electrode positioned on a bottom surface of the silicon dioxide;
c) a lithium niobate waveguide formed on a top surface of the silicon dioxide substrate, the waveguide having a slab region and a ridge region configured to confine an optical mode traversing the optical modulator under the ridge region;
d) an electro-optic polymer positioned on a top surface of the lithium niobate waveguide and configured to support an evanescent tail of the optical mode traversing the optical modulator under the ridge region; and
e) an electrode on a top surface of the electro-optic polymer.

2. The optical modulator of claim 1 wherein the lithium niobate ridge waveguide comprises Z-cut lithium niobate.

3. The optical modulator of claim 1 wherein a thickness of the electro-optic polymer is less than one micron thick in a region over the slab region.

4. The optical modulator of claim 1 wherein the electro-optic polymer material comprises an electro-optic coefficient, $r_{33}$, that is between 100 pm/V and 1000 pm/V.

5. The optical modulator of claim 1 wherein the electro-optic polymer material comprises an electro-optic coefficient, $r_{33}$, that is greater than 1000 pm/V.

6. The optical modulator of claim 1 wherein the electrode positioned on the top of the electro-optic polymer film is parallel to the slab region of the lithium niobate waveguide.

7. The optical modulator of claim 1 wherein a width of the ridge region of the lithium niobate waveguide is in the range of 0.1-5 µm.

8. The optical modulator of claim 1 wherein the electro-optic polymer is selected so that a $V_\pi *L$ product is in a range from 5 V-mm to 42 V-mm.

9. The optical modulator of claim 1 wherein a $V_\pi *L$ product is less than 5 V-mm.

10. The optical modulator of claim 1 wherein the waveguide is configured so that the evanescent tail of the optical mode traversing the optical modulator experiences modulation from an applied electric field that achieves a predetermined switching voltage-length product.

11. The optical modulator of claim 1 wherein a thickness and a type of the electro-optic polymer is chosen so that the evanescent tail of the mode expands into the electro-optic material a desired length when the electrode on the top surface of the electro-optic polymer is energized.

12. The optical modulator of claim 1 wherein the waveguide is configured so that the evanescent tail of the optical mode traversing the optical modulator experiences a desired amount of modulation from the electric field, which reduces a switching voltage-length product ($V_\pi *L$) to a desired amount.

13. A method of efficiently modulating light, the method comprising:
a) forming a lithium niobate waveguide with a slab region and a ridge region to confine an optical mode traversing the optical modulator under the ridge region;
b) forming an electro-optic polymer on a top surface of the lithium niobate waveguide with the slab region and the ridge region having dimension sufficient to support an evanescent tail of the optical mode traversing the optical modulator under the ridge region during modulation;
c) applying light to an input of the lithium niobate waveguide; and
d) applying a drive voltage to the electro-optic polymer that modulates the light with the evanescent tail so that the mode expands into the electro-optic polymer material a length that provides a desired switching voltage-length product ($V_\pi *L$).

14. The method of claim 13 further comprising selecting an electro-optic coefficient, $r_{33}$, to provide a desired switching voltage-length product ($V_\pi *L$).

15. The method of claim 13 further comprising selecting a thickness of the electro-optic polymer to provide a desired switching voltage-length product ($V_\pi *L$).

16. An optical modulator comprising:
a) a silicon dioxide substrate;
b) a lithium niobate waveguide formed on a top surface of the silicon dioxide substrate, the waveguide having a slab region and a ridge region configured to confine an optical mode traversing the optical modulator under the ridge region;
c) an electro-optic polymer positioned on a top surface of a portion of the lithium niobate waveguide and configured to support an evanescent tail of the optical mode traversing the optical modulator under the ridge region;

d) a first electrode positioned to contact both the lithium niobate waveguide and the electro-optic polymer on a first side; and e) a second electrode positioned to contact both the lithium niobate waveguide and the electro-optic polymer on a second side.

17. The optical modulator of claim 16 wherein the lithium niobate ridge waveguide comprises X-cut lithium niobate.

18. The optical modulator of claim 16 wherein the electro-optic polymer material comprises an electro-optic coefficient, $r_{33}$, that is between 100 pm/V and 1000 pm/V.

19. The optical modulator of claim 16 wherein the electro-optic polymer material comprises an electro-optic coefficient, $r_{33}$, that is greater than 1000 pm/V.

20. The optical modulator of claim 16 wherein a width of the ridge region of the lithium niobate waveguide is in the range of 0.1-5 μm.

21. The optical modulator of claim 16 wherein the electro-optic polymer is selected so that a $V_\pi {*} L$ product is in a range from 5 V-mm to 42 V-mm.

22. The optical modulator of claim 16 wherein a $V_\pi {*} L$ product is less than 5 V-mm.

23. The optical modulator of claim 16 wherein the waveguide is configured so that the evanescent tail of the optical mode traversing the optical modulator experiences modulation from an applied electric field that achieves a predetermined switching voltage-length product.

24. The optical modulator of claim 16 wherein a thickness and a type of the electro-optic polymer is chosen so that the evanescent tail of the mode expands into the electro-optic material a desired length when the electrodes are energized.

25. The optical modulator of claim 16 wherein the waveguide is configured so that the evanescent tail of the optical mode traversing the optical modulator experiences a desired about of modulation from an applied electric field, thereby reducing a switching voltage-length product ($V_\pi {*} L$) to a desired amount.

\* \* \* \* \*